(12) United States Patent
Grywacheski et al.

(10) Patent No.: US 7,462,101 B2
(45) Date of Patent: Dec. 9, 2008

(54) FRUSTO-CONICAL DRUM INFEED AND THRESHING REGION FOR A COMBINE ROTOR

(75) Inventors: Sheldon Joseph Grywacheski, Eldridge, IA (US); Glenn Everett Pope, Viola, IL (US); Jason Michael Healy, Port Byron, IL (US); Jeffrey Ray Payne, Cordova, IL (US); Ryan Scott Herlyn, Port Byron, IL (US); Ryan Patrick Mackin, Milan, IL (US); Kevin Laverne Ehrecke, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/408,827

(22) Filed: Apr. 20, 2006

(65) Prior Publication Data
US 2006/0189361 A1 Aug. 24, 2006

(51) Int. Cl.
*A01F 12/00* (2006.01)
(52) U.S. Cl. .............................. 460/68; 460/70; 460/16; 460/20; 460/119
(58) Field of Classification Search .................... 460/16, 460/20, 66, 68–70, 80, 107, 119
See application file for complete search history.

(56) References Cited

U.S. PATENT DOCUMENTS

| | | | | |
|---|---|---|---|---|
| 3,982,548 | A * | 9/1976 | Stamp et al. ................... | 460/68 |
| 4,177,821 | A * | 12/1979 | Peiler et al. .................... | 460/70 |
| 4,919,641 | A * | 4/1990 | Yarmashev et al. ........... | 460/69 |
| 5,045,025 | A * | 9/1991 | Underwood .................. | 460/66 |
| 5,145,462 | A * | 9/1992 | Tanis et al. ..................... | 460/68 |
| 6,083,102 | A * | 7/2000 | Pfeiffer et al. ................ | 460/68 |
| 6,193,604 | B1 * | 2/2001 | Ramp et al. .................. | 460/110 |
| 6,468,152 | B2 * | 10/2002 | Moriarty ....................... | 460/67 |
| 6,688,970 | B2 * | 2/2004 | Tanis ............................ | 460/68 |
| 7,070,498 | B2 * | 7/2006 | Grywacheski et al. ........ | 460/68 |
| 2005/0020330 | A1 * | 1/2005 | Mackin et al. ................ | 460/71 |

* cited by examiner

*Primary Examiner*—Thomas B Will
*Assistant Examiner*—Jamie L McGowan

(57) ABSTRACT

A rotor, in an agricultural harvester crop processing unit, comprising a drum to which crop processing elements for an infeed section and a threshing section are affixed. The drum comprises a rearward cylindrical portion and a forwardly extending frusto-conical portion. The frusto-conical portion is divided into an aft-region adjacent to the rearward cylindrical portion of the drum, and a fore-region. The infeed section has at least one infeed element located on the fore-region of the frusto-conical portion of the drum. The crop processing section has at least one crop processing element located on the aft-region of the frusto-conical portion of the drum.

18 Claims, 2 Drawing Sheets

FRUSTO-CONICAL DRUM INFEED AND THRESHING REGION FOR A COMBINE ROTOR

This application claims priority from Ser. No. 10/629,298 filed on Jul. 29, 2003, now U.S. Pat. No. 7,070,498 under 35 USC 120 as a Continuation Application.

FIELD OF THE INVENTION

The present invention is directed to a combine rotor having both infeed and threshing sections on a common frusto-conical portion of the rotor drum.

BACKGROUND OF THE INVENTION

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Rotary combines have one or two large rotors for threshing and separating the harvested crop material. In most rotary combines the rotor or rotors are arranged along the longitudinal axis of the machine. These rotors are provided with an infeed section for receiving harvested crop material, a threshing section for threshing the harvested crop material received from the infeed section and a separating section for freeing grain trapped in the threshed crop material received from the threshing section.

Rotors have been provided for combines in a variety of configurations to optimize harvesting efficiency for a wide variety of crops and crop conditions. Examples include variations on cylindrical and frusto-conical drum shapes disclosed in U.S. Pat. Nos. 4,139,013, 4,266,560, and 4,272,426.

SUMMARY OF THE INVENTION

The present invention is for a combine rotor having both infeed and threshing sections on a common frusto-conical portion of the rotor drum. The rotor in the infeed section is provided with helical infeed elements located on the fore-region of the frusto-conical portion of the drum. Immediately downstream from the infeed section, the threshing section is provided with a number of threshing elements. A portion of the threshing elements are attached to the aft-region of the frusto-conical portion of the drum, with the remaining portion being attached to the rearward cylindrical portion.

DETAILED DESCRIPTION

Figure 1:
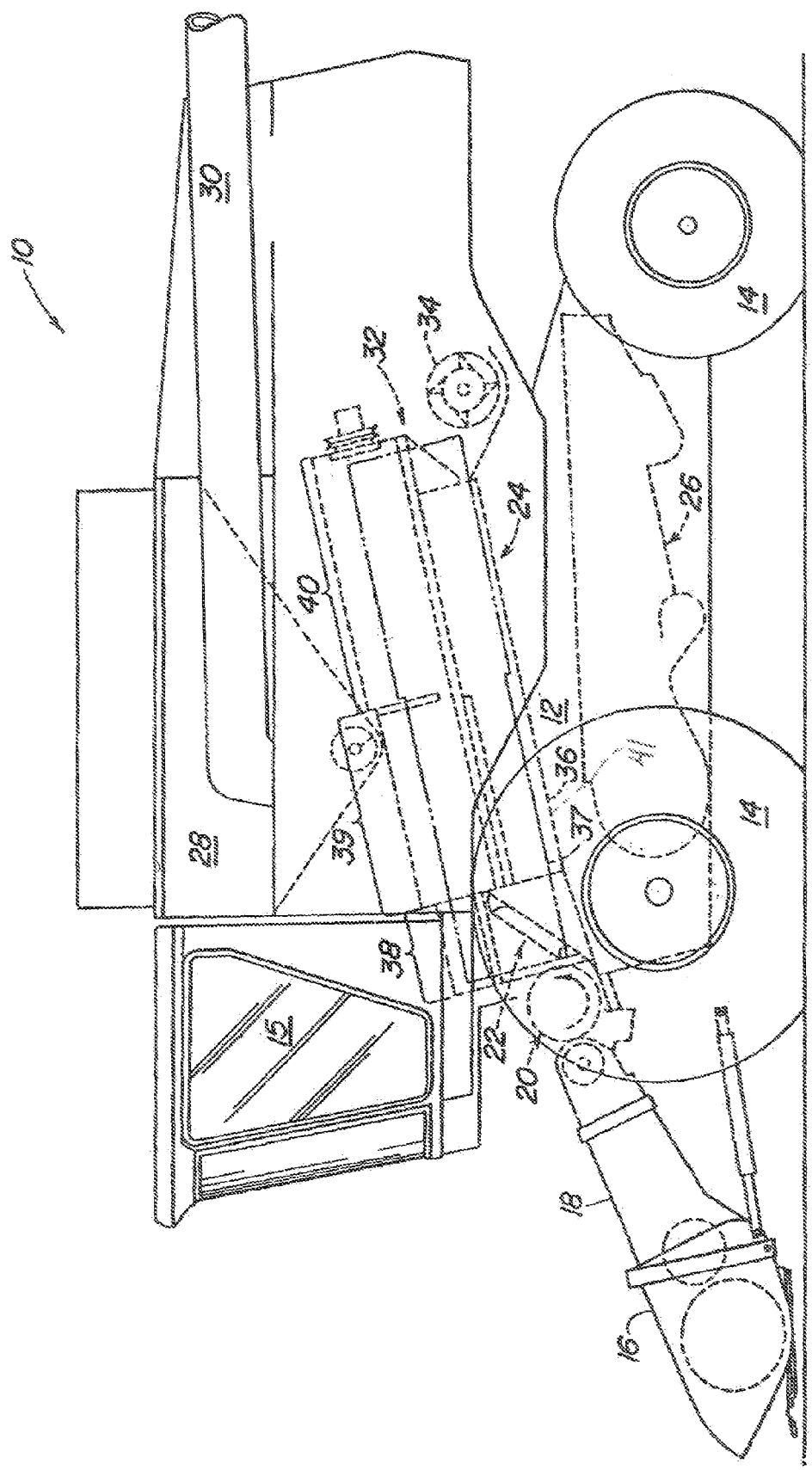
FIG. 1 is a semi-schematic side view of a rotary agricultural combine.
Figure 2:
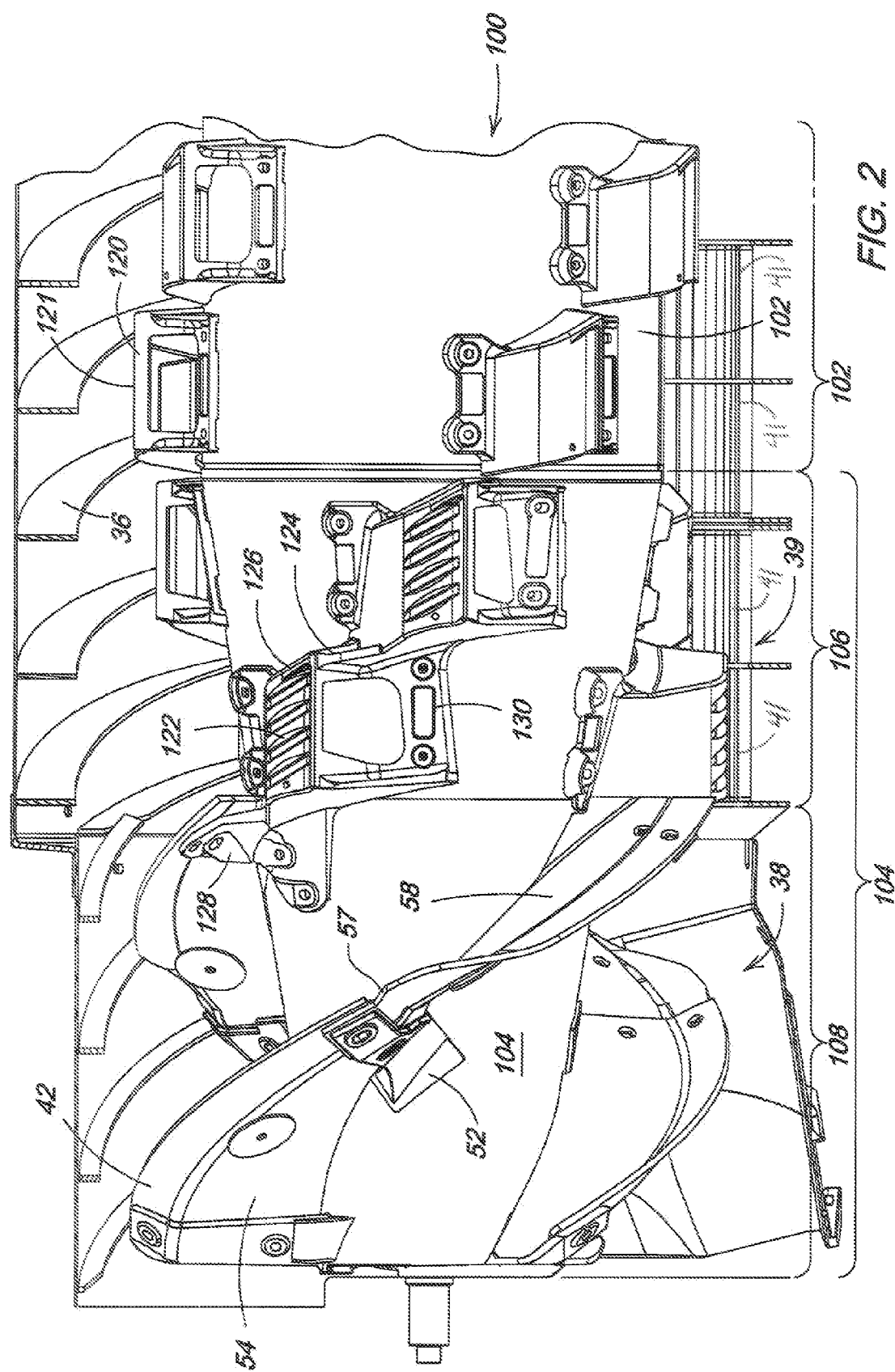
FIG. 2 is a side view of the infeed and threshing sections of the rotor.

FIG. 1 shows an agricultural combine 10 comprising a supporting structure 12 having ground engaging wheels 14 extending from the supporting structure. The operation of the combine is controlled from operator's cab 15. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit 24 threshes and separates the harvested crop material. Grain and chaff fall through grates 41 on the bottom of the unit 24 to the cleaning system 26. The cleaning system 26 removes the chaff and directs the clean grain to a clean grain elevator (not shown). The clean grain elevator deposits the clean grain in grain tank 28. The clean grain in the tank 28 can be unloaded into a grain cart or truck by unloading auger 30. Threshed and separated straw is discharged from the axial crop processing unit 24 through outlet 32 to discharge beater 34. The discharge beater 34 in turn propels the straw out the rear of the combine.

The axial crop processing unit 24 comprises a rotor housing 36 and a rotor 37 located inside the housing 36. The front part of the rotor 37 and the rotor housing 36 define the infeed section 38 of the crop processing unit. Longitudinally downstream from the infeed section 38 are threshing section 39 and separating section 40. The rotor 37 comprises a drum 100 to which crop processing elements for the infeed section, threshing section, and separating section are affixed. The drum 100 comprises a rearward cylindrical portion 102 and a forwardly extending frusto-conical portion 104. The surface of the frusto-conical portion 104 is divided into an aft-region 106 adjacent to the rearward cylindrical portion 104 of the drum, and a fore-region 108.

The rotor 37 in the infeed section 38 is provided with helical infeed elements 42 located on the fore-region 108 of the frusto-conical portion of the drum. The helical infeed elements 42 engage harvested crop material received from the beater 20 and inlet transition section 22. The infeed elements 42 are comprised of a forward portion 54 and a rearward portion 58. The forward portion 54 of each infeed element 42 is bolted to the drum 100 by mounting assemblies 52. The rearward portion 58 of each infeed element 42 is bolted to an infeed element attachment feature 128 extending from an adjacent threshing element 122.

Immediately downstream from the infeed section 38 is the threshing section 39 of the crop processing unit 24. In the threshing section 39 the rotor 37 is provided with a number of threshing elements 120 and 122 for threshing the harvested crop material received from the infeed section 38. Threshing elements 122 are attached to the aft-region 106 of the frusto-conical portion of the drum, with threshing elements 120 attached to the rearward cylindrical portion 102. The threshing elements 120 located on the cylindrical portion 102 of the drum 50 each comprise a hollow support structure with one crop engaging portion 121.

The threshing elements 122 located on the aft-region 106 of the frusto-conical portion of the drum 50 are composite threshing elements comprising a hollow support structure 124 with two outwardly extending crop engaging portions 126 that sweep a cylindrical path upon rotation of the rotor. Extending forward from the threshing element 122 is the aforementioned infeed element attachment feature 128 to which the rearward portion 58 of the adjacent infeed element 42 is attached. The base of the threshing element 122 is provided with mounting flanges 130, through which mounting bolts 57 pass for securing the threshing element 122 to the drum 100.

The threshing elements 122 are shown in the illustrated embodiment with two crop engaging portions 126 fixed in a staggered arrangement, however, they may be provided with one or more crop engaging portions 126 in a variety of arrangements. Additionally, the crop engaging portions 126 are illustrated with rasp features, but may also be provided with other surface profiles, such as that disclosed in U.S. Pat. No. 6,036,598.

The outwardly extending crop engaging portions 126 are shown in the illustrated embodiment as sweeping a cylindrical path with a common diameter to the path swept by the crop engaging portion 121 of threshing elements 120 on the rearward cylindrical portion 102 of the rotor drum. However, the crop engaging portions 126 of the composite threshing elements 122 could be adapted to sweep cylindrical path diameters different than those of the crop engaging portion 121 of threshing elements 120, or of adjacent crop engaging portions 126 of the same threshing element 122.

Having described the illustrated embodiment, it will become apparent that various modifications can be made without departing from the scope of the invention as defined in the accompanying claims.

The invention claimed is:

1. A crop processing unit for an agricultural harvester having at least an infeed section and a threshing section, the crop processing unit comprising:
   (A) a rotor further comprising a drum having (i) a frusto-conical shaped portion comprising (a) a frusto-conical fore-region and (b) a frusto-conical aft-region, and (ii) a downstream cylindrical shaped portion, wherein the frusto-conical portion is adjacent to and upstream of the cylindrical portion; and
   (B) a rotor housing further comprising (i) an infeed portion, and (ii) a threshing portion adjacent to and downstream of the infeed portion, said threshing portion comprising non-rotating grates;
   wherein the fore-region of the frusto-conical portion is disposed in the infeed portion of the rotor housing;
   wherein the aft-region of the frusto-conical portion is disposed in the threshing portion of the rotor housing and radially inward from said grates and overlaps said grates, said grates lying in a cylindrical plane inside of said rotor housing; and
   wherein the cylindrical portion of the rotor is at least partly disposed in the threshing portion of the rotor housing.

2. The crop processing unit of claim 1 wherein a junction between the frusto-conical portion and the cylindrical portion is disposed in the threshing portion.

3. The crop processing unit of claim 1, wherein the fore-region extends through the infeed portion of the rotor housing.

4. The crop processing unit of claim 3, wherein the infeed section of the crop processing unit comprises (A) the fore-region of the frusto-conical portion of the drum, and (B) the infeed portion of the rotor housing.

5. The crop processing unit of claim 1, wherein the aft-region of the frusto-conical portion of the drum extends into the threshing portion.

6. The crop processing unit of claim 5, wherein the aft-region of the frusto-conical portion and at least a portion of the immediately adjacent cylindrical portion together with the threshing portion of the rotor housing comprise the threshing section of the crop processing unit.

7. The crop processing unit of claim 1, further comprising a plurality of threshing elements fixed to the surfaces of both the frusto-conical and cylindrical portions of the drum, wherein said plurality of threshing elements are axially spaced apart at least along the cylindrical portion of the drum.

8. The crop processing unit of claim 7, wherein the plurality of individual elements are disposed on the surface of the drum in a helical arrangement.

9. The crop processing unit of claim 1 wherein the drum further comprises (A) at least one helical flight fixed to the fore-region of the frusto-conical portion of the drum, and (B) a plurality of axially spaced-apart threshing elements fixed (i) to the aft-region of the frusto-conical portion of the drum and (ii) to the cylindrical portion.

10. A crop processing unit for an agricultural harvester, the crop processing unit comprising:
    (A) a rotor drum configured as (i) a frustum of a cone and (ii) a cylinder, the frustum having a front and rear, wherein the rear is fixed to the front of the cylinder; and
    (B) a rotor housing having (i) an infeed section and (ii) a threshing section, said threshing portion comprising grates, wherein the front of the frustum is disposed in the infeed section, and wherein the rear of the frustum and the cylinder are disposed in the threshing section and radially inward from said grates and overlaps said grates, said grates lying in a cylindrical plane inside of said rotor housing, and further wherein the infeed section further has an outlet in communication with the threshing section and an inlet.

11. The crop processing unit of claim 10 wherein a junction between the frustum and the cylinder is disposed in the threshing section.

12. The crop processing unit of claim 10, wherein the front of the frustum extends through the infeed section of the rotor housing and into the front of the infeed portion of the rotor housing.

13. The crop processing unit of claim 12, wherein the front of the frustum and the infeed section together define an infeed portion of the crop processing unit that is configured to receive harvested crop material.

14. The crop processing unit of claim 10, wherein the rear of the frustum extends from the front of the threshing section into the threshing section.

15. The crop processing unit of claim 14, wherein the rear of the frustum and at least a portion of the cylinder together with the threshing section of the rotor housing define a threshing section of the crop processing unit.

16. The crop processing unit of claim 10, further comprising a plurality individual threshing elements individually fixed to the surfaces of both the frustum and cylinder, and further wherein said plurality of threshing elements are axially spaced apart at least along the cylindrical portion of the drum.

17. The crop processing unit of claim 16, wherein the plurality of individual elements extend across the surface of the drum in a helical arrangement.

18. The crop processing unit of claim 10 wherein the drum further comprises (A) at least one helical flight fixed to the front of the frustum and (B) a plurality of axially spaced-apart threshing elements fixed to (i) the rear of the frustum and (ii) the cylinder.

* * * * *